United States Patent [19]

Breed

[11] Patent Number: 5,505,485
[45] Date of Patent: Apr. 9, 1996

[54] PLASTIC FILM AIRBAG

[75] Inventor: David S. Breed, Boonton Township, N.J.

[73] Assignee: Automotive TEchnologies International, Inc., Denville, N.J.

[21] Appl. No.: 247,763

[22] Filed: May 23, 1994

[51] Int. Cl.$^6$ .......................... B60R 21/24; B60R 21/16
[52] U.S. Cl. ...................... 280/729; 280/743.1; 280/739
[58] Field of Search ........................... 280/729, 743 R, 280/743 A, 728 R, 739, 738, 730 R, 731, 732, 743.1, 743.2, 728.1, 730.1

[56] References Cited

U.S. PATENT DOCUMENTS

| | | | |
|---|---|---|---|
| 3,451,693 | 6/1969 | Carey | 280/739 |
| 3,638,755 | 2/1972 | Sack | 280/729 |
| 3,675,942 | 7/1972 | Huber | 280/738 |
| 3,702,706 | 11/1972 | Sobkow | 280/730 R |
| 3,752,501 | 8/1973 | Daniel et al. | 280/729 |
| 4,657,516 | 4/1987 | Tassy | 280/729 |
| 4,963,412 | 10/1990 | Kokeguchi | 280/743 R |
| 4,964,652 | 10/1990 | Karlow | 280/739 |

FOREIGN PATENT DOCUMENTS

| | | | |
|---|---|---|---|
| 2122019 | 11/1971 | Germany | 280/729 |
| 0041437 | 2/1989 | Japan | 280/743 R |
| 0306849 | 12/1990 | Japan | 280/743 R |

*Primary Examiner*—Margaret A. Focarino
*Assistant Examiner*—Peter C. English
*Attorney, Agent, or Firm*—Samuel Shipkovitz

[57] ABSTRACT

A thin plastic film is used to make the airbag of this invention. A preferred embodiment uses multiple thin film airbags which are inflated and confined to act together through the use of a surrounding net. In another embodiment, multiple layers of anisotropic film are joined together to form an airbag which is resistant to tearing. The inflator, which is typically of the aspirated type, fills the airbags through a manifold in a controlled sequence until each bag is filled to a specific pressure indicative of either being fully inflated or of interaction with an occupant.

17 Claims, 14 Drawing Sheets

PLASTIC FILM AIRBAG

BACKGROUND OF THE INVENTION

Airbags today are made from woven material which is usually nylon or, more recently, polyester. This material is frequently coated with either neoprene or silicon rubber which results in a material having substantial mass and which can cause an occupant to be injured when struck by an inflating airbag. According to one estimate, as many as one third of all of the occupants that are involved in car crashes where the airbag deploys are injured by the airbag. Those that are unfortunate enough to be resting against the airbag when it deploys can be seriously injured or even killed by the airbag cover or deployment door as the airbag initially emerges from its housing. However, the vast majority of the cases involve impact injuries between the airbag fabric and the occupant's face or arms. Experimental results published in a recent Society of Automotive Engineers paper show that the cause of the injury is from the momentum of the bag material as it strikes the occupant and not from abrasion of the airbag rubbing on the occupant.

Airbag systems today are designed so that ideally the airbag is fully inflated before the occupant moves into the space which will be occupied by the airbag. However, most occupants are not positioned at the ideal location assumed by the airbag system designer. Many occupants sit very close to the airbags and thus are injured by the airbag deployment and others sit far from the airbag and therefore must travel some distance before receiving the benefit of the airbag.

Severe out of position occupant situations, where the occupant is resting against the airbag when deployment begins, can only be handled using an occupant position sensor, such as disclosed in copending patent application Ser. No. 08/040,978 which prevents an airbag from deploying if an occupant is more likely to be seriously injured by the airbag deployment than from the accident itself. In many less severe accidents, the occupant will still interact with the deploying airbag and sustain injuries ranging from the mild to the severe. In addition, some occupants sit very far from the steering wheel or instrument panel and, with conventional airbags, a significant distance remains even after the airbag is fully inflated. For these reasons it would be desirable to have an airbag system that adjusts to the location of the occupant and where the impact of the airbag causes little or no injury.

Airbags made from plastic film have heretofore not been used. One reason is that if a film bag is as large as a conventional airbag it must also be quite strong and therefore nearly as heavy as a woven airbag. This results from the fact that if a film airbag is punctured it can fail catastrophically like a bursting balloon.

There is a great deal of concern today for the safety of a child in a rear facing child seat when it is used in the front seat of an airbag equipped vehicle. The passenger side airbag has sufficient force to cause significant injury to a child sitting in such a seat and parents are warned not to use child seats in the front seat of a vehicle having a passenger side airbag. Several automobile companies are now experimenting with rear seat airbags where the child seat problem would be compounded. Also, especially on long trips, children frequently lie down in the front or rear seats of the vehicle to sleep. Present airbag systems are incapable of protecting such occupants who will slide underneath the airbag.

Airbags are designed to interact with an occupant in a symmetrical fashion. Many accidents have substantial angularity resulting in an occupant impacting with one edge of the airbag and thereafter sliding off of the airbag without receiving it's full protection capability.

These and many other problems associated with current airbags are solved by the airbag designs disclosed in the paragraphs below.

SUMMARY OF THE INVENTION

In a preferred implementation of the present invention, multiple thin film airbags are inflated and confined to act together through the use of a surrounding net. The inflator, which is typically of the aspirated type, fills the airbags through a manifold in a controlled sequence until each bag is filled with a specific pressure indicative of either being fully inflated or of interaction with an occupant. The pressure in each airbag is low until the airbag interacts with the occupant and the pressure then begins to rise. Thus, the airbags substantially surround the occupant providing the maximum protection.

The principle objects of this invention are:

1. To substantially reduce the cost and weight of airbags through the use of thin films.
2. To utilize thin film airbags in a manner which eliminates the catastrophic bursting of the film in the event of an inadvertent puncture.
3. To provide an occupant restraint airbag system for a single occupant which is composed of several smaller airbags.
4. To provide an airbag system for the protection of an occupant which automatically adjusts to the occupant's seating position.
5. To provide an airbag system which automatically adjusts to the presence of a child seat.
6. To provide an airbag system which provides knee protection for the seated occupant and protection for the child lying on the vehicle seat.
7. To provide an airbag system which exhausts back through the inflator structure thereby eliminating the need for vent holes in the airbag.
8. To provide a method of containing a plurality of airbags through the use of a net structure.
9. To provide an alternate system to a net using an airbag which is inflated by other airbags.
10. To provide an airbag system having a variable exit orifice to reduce the peak chest acceleration, to reduce the amount of propellant required, and to permit more efficient use of the airbag deflation.
11. To provide a simple construction method for an airbag composed of several mini-airbags.

These and other objects and advantages of the present invention will become evident through the description of the preferred embodiments which follows.

DETAILED DESCRIPTION OF THE PREFERRED EMBODIMENTS

A fundamental problem with the use of plastic films for airbags is that when a single film is used and a tear is introduced into the film, the tear propagates easily and the airbag fails catastrophically. This invention is concerned with various methods of eliminating this problem and thus of permitting the use of films for airbags with the resulting substantial cost and space savings as well as a significant reduction in injuries to occupants.

One method of solving the tear problem is to use two airbags, one inside the other, where the airbags are attached to each other with an adhesive which is strong enough to hold the two bags closely together but not sufficiently strong to permit a tear in one bag to propagate to the other. If a tear is initiated in the outer airbag, for example, the material cannot support significant tensile stresses in the material close to the tear, so the inner airbag must accommodate the increased tensile stress until it can be transferred to the outer bag at some distance from the tear. If the tear is caused by a small hole, this increased stress in the inner bag may only occur for a few hole diameters away from the hole.

A problem arises with this system when the cause of the tear in one airbag also causes a tear in the second airbag. This problem can be solved if the materials used for the two airbags are strongly anisotropic and are attached to each other with their preferred tear directions placed at right angles to each other. In this case, even though a tear starts in both airbags at the same time and place, the tear will propagate along mutually perpendicular directions and a catastrophic failure will be avoided. An example of a two bag construction is illustrated in FIG. 1 which is a perspective view with portions cut away and removed of a film airbag within the second larger film airbag.

Figure 1:
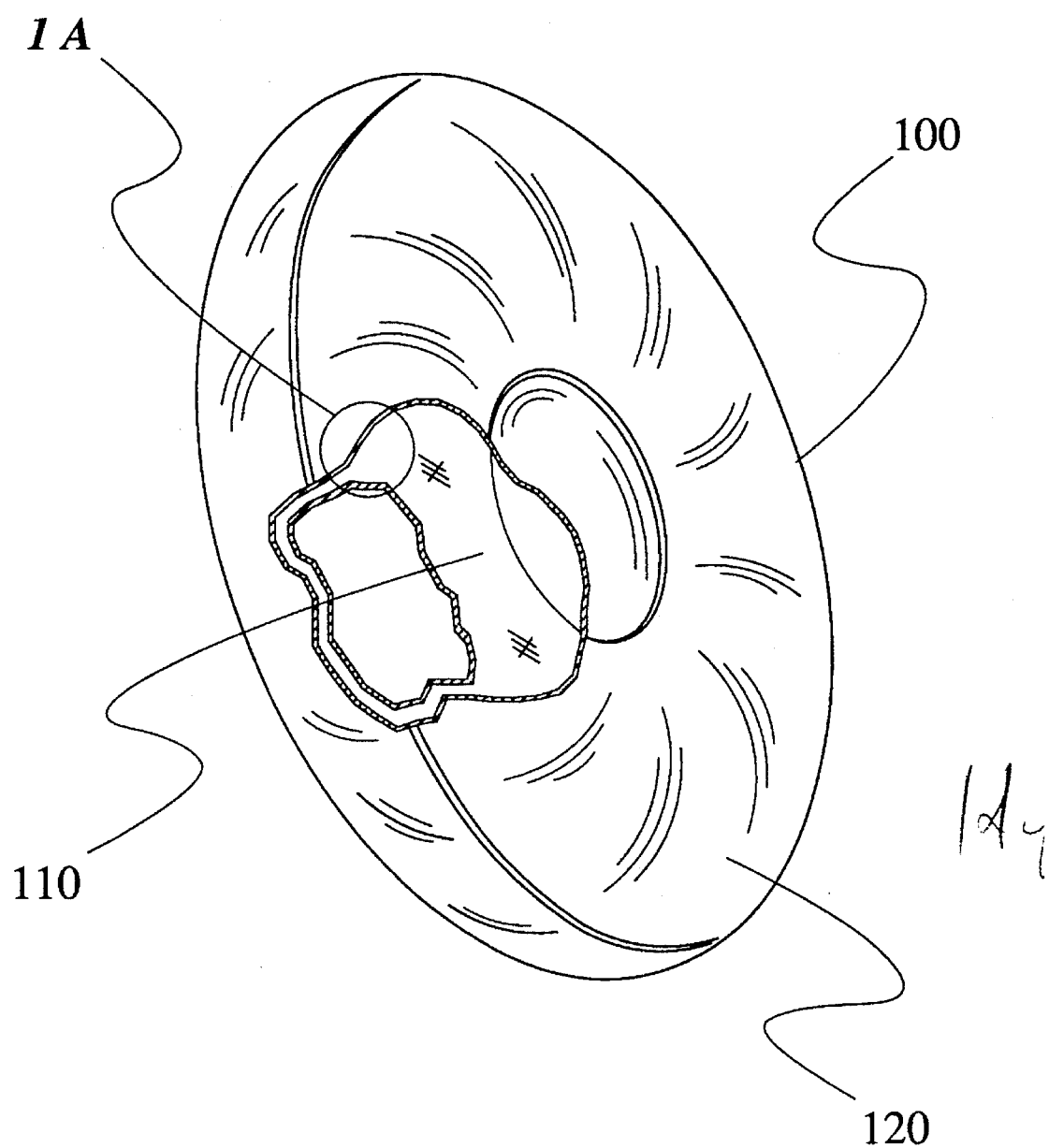
FIG. 1 is a perspective view with portions cut away and removed of a film airbag within a second larger film airbag.
Figure 1A:
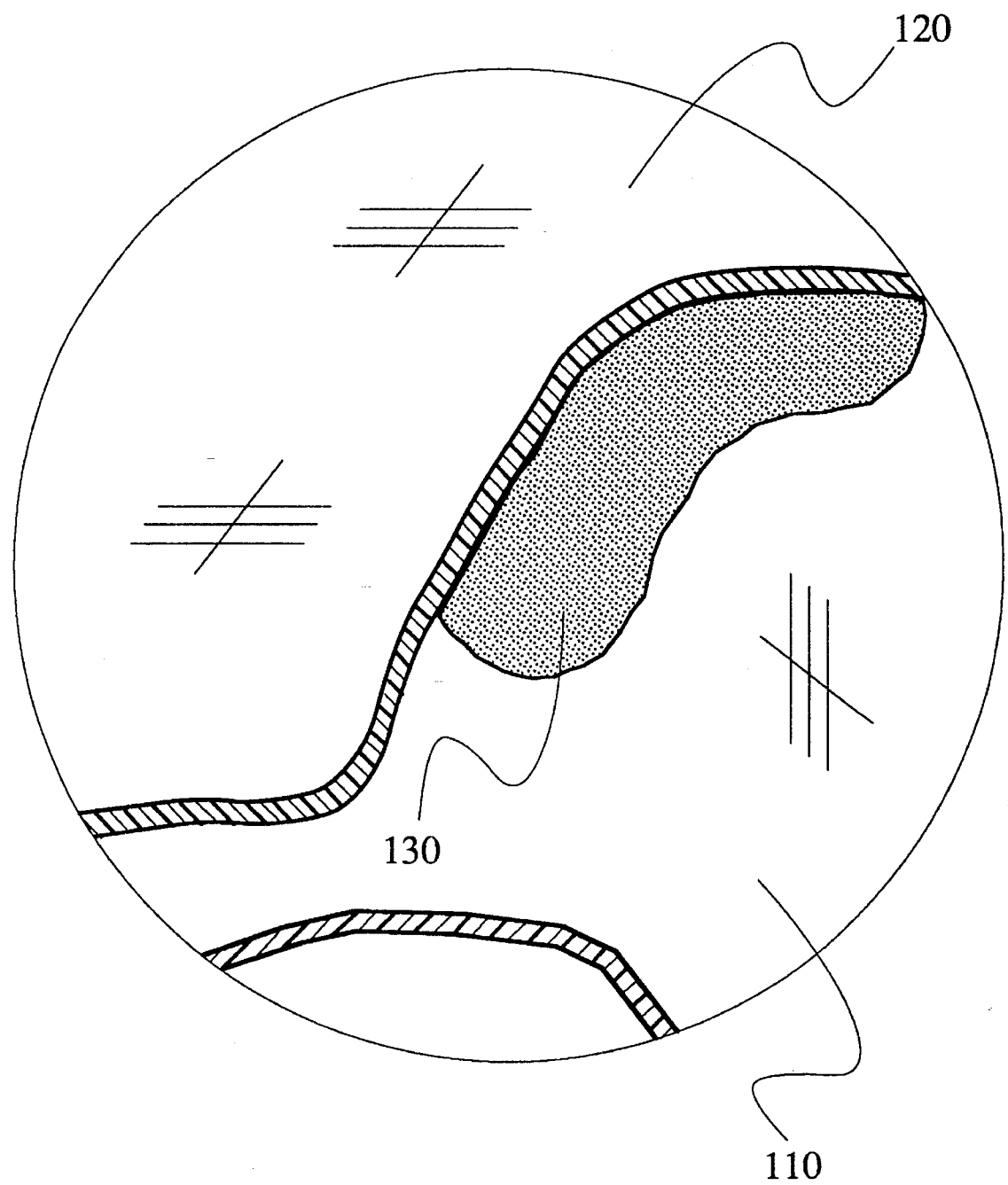
FIG. 1A is an enlarged view of the inner film airbag and outer film airbag taken within circle 1A of FIG. 1.

In FIG. 1, the airbag system is shown in the inflated condition generally at 100 with one airbag 110 lying inside a second airbag 120. FIG. 1A is an enlarged view of the material of the inner airbag 110 and outer airbag 120 taken within circle 1A of FIG.1. When manufactured, the film of the inner airbag was made so that the preferred tear propagation direction is in the vertical direction, for example, as shown in FIG. 1A. In this case, the preferred tear direction for the film of the outer airbag 120 would be in the horizontal direction. The two film layers are held together by an adhesive 130. In FIG. 1 a driver side airbag is illustrated where the bag is formed from two flat pieces of material and a center cylindrical piece all of which are joined together using heat sealing with appropriate reinforcement at the heat sealed joints.

The example of FIG. 1 is meant to be illustrative of a general technique to minimize the propagation of tears in a composite airbag as defined below. In an actual airbag construction the process can be repeated several times to create a composite airbag composed of several layers each joined together with adhesives which are weaker than the films. For the purposes of this disclosure, the term "composite airbag" will mean: a film airbag composed of two or more layers which may or may not be joined together including cases where the layers are joined during an extrusion processing step such as in co-extrusion; or, where a film layer is combined with another reinforcing material such as fibers or a woven or molded net.

The materials used for the various film layers can be the same or different and are generally made from nylon, polyethylene or polyester, although other materials could also be used. The use of different materials for the different layers has the advantage that tear propagation and strength properties can complement each other. For example, a material which is very strong but tears easily can be alternated with a weaker material which requires a greater elongation before the tear propagates. Another reason for using different materials is to minimize the sticking of the layers of the film material when the airbag is folded and stored for a long period. For this case the film may be composed of several layers with the outer layer made from a mini-stick material such as polyethylene or Teflone®.

In the implementation of FIG. 1, the adhesive 130 has been applied in a uniform coating between the film layers. In some cases it is preferable to place the adhesive non continuous, usually in a pattern, so as to permit a tear to propagate a small distance before the stress is transferred between layers. This permits the stress concentration points to move a small distance away from each other in the two films and further reduces the chance that a catastrophic failure will result.

Figure 1B:
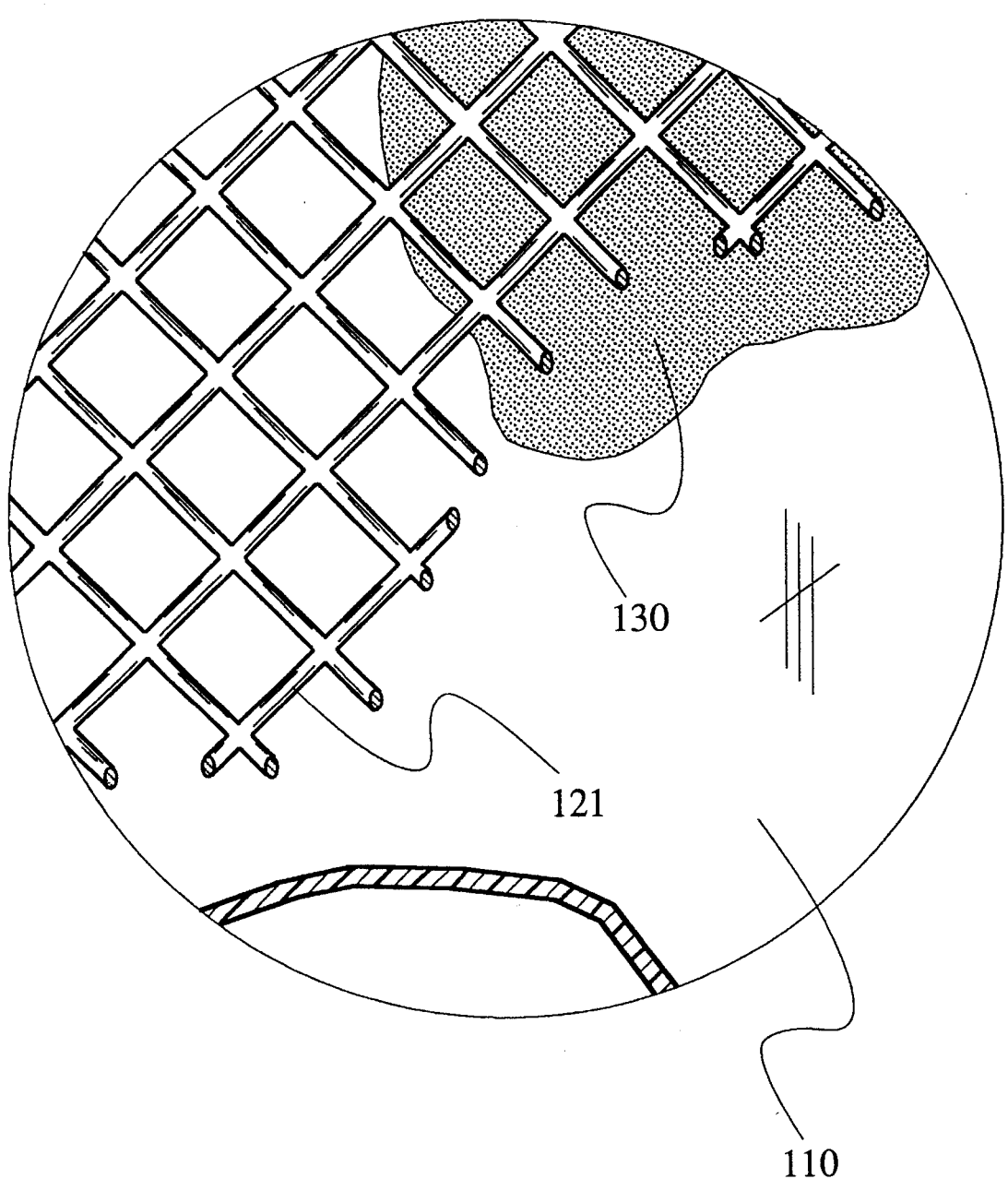
FIG. 1B is an enlarged view of the material of the inner film airbag and outer film airbag taken within circle 1A of FIG. 1 but showing an alternate configuration where the outer airbag has been replaced by a net.

FIG. 1B illustrates an alternate configuration where the outer airbag has been replaced by a net. The net 121 can be attached by an adhesive 130, or by another method such as heat sealing, to the inner airbag 110 or it can be left unattached. In this case the stress in the inner bag is transferred to the net which is designed to carry the main stress of the composite airbag and the film is used mainly to seal and prevent the gas from escaping. Since there is very little stress in the inner airbag, a tear will in general not propagate at all unless there is a failure in the net structure. The net in this illustration has a mesh with openings of about 0.25 inches. The adhesive also serves the useful purpose of minimizing the chance that the net will snag buttons or other objects which may be worn by an occupant.

Figure 1C:
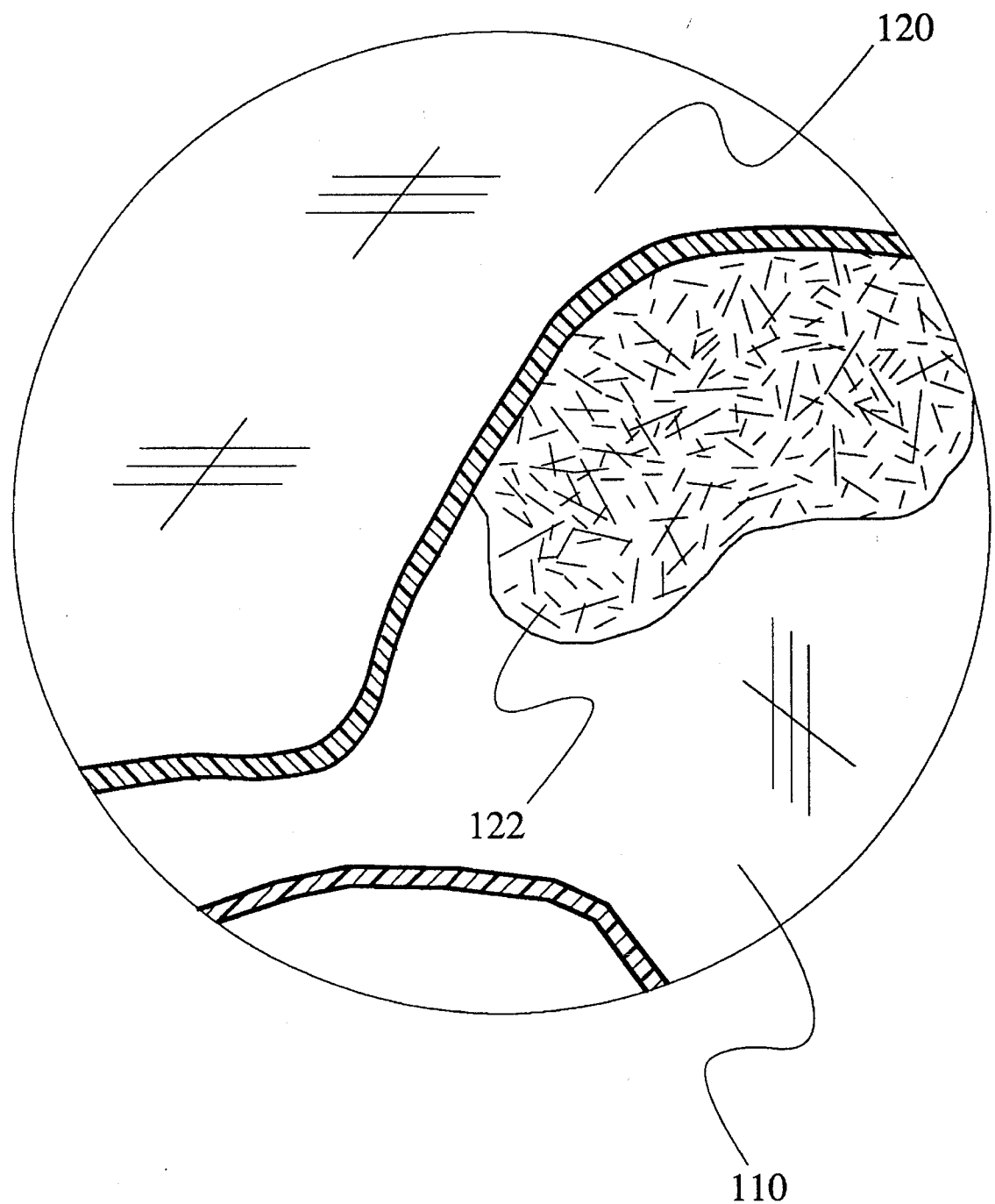
FIG. 1C is an enlarged view of the material of the inner film airbag and outer film airbag taken within circle 1A of FIG. 1 but showing an alternate configuration where fibers of Kevlar are incorporated into the adhesive layer between the two films.

Many other variations are possible. In one case, for example, the net 121 is placed between two layers of film so that the outer surface of the composite airbag is smooth. In another case shown in FIG. 1C, fibers of Kevlar or other suitable material, are randomly placed and sealed between two films. In this design the fibers 122 act to prevent the propagation of tears.

Figure 1D:
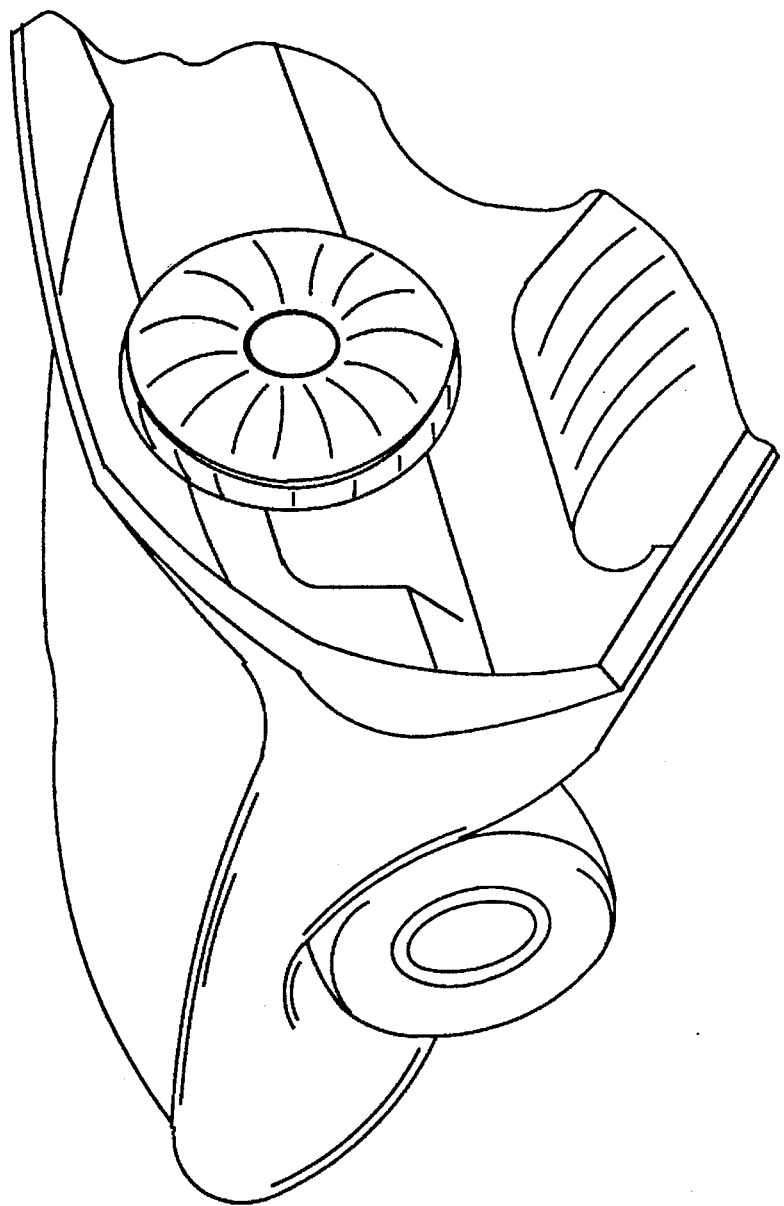
FIG. 1D is a perspective view with portions cut away of a vehicle showing the driver airbag of FIG. 1 mounted on the steering wheel and inflated.

The driver airbag of FIG. 1 is shown mounted on a vehicle and inflated in FIG. 1D.

Figure 2:
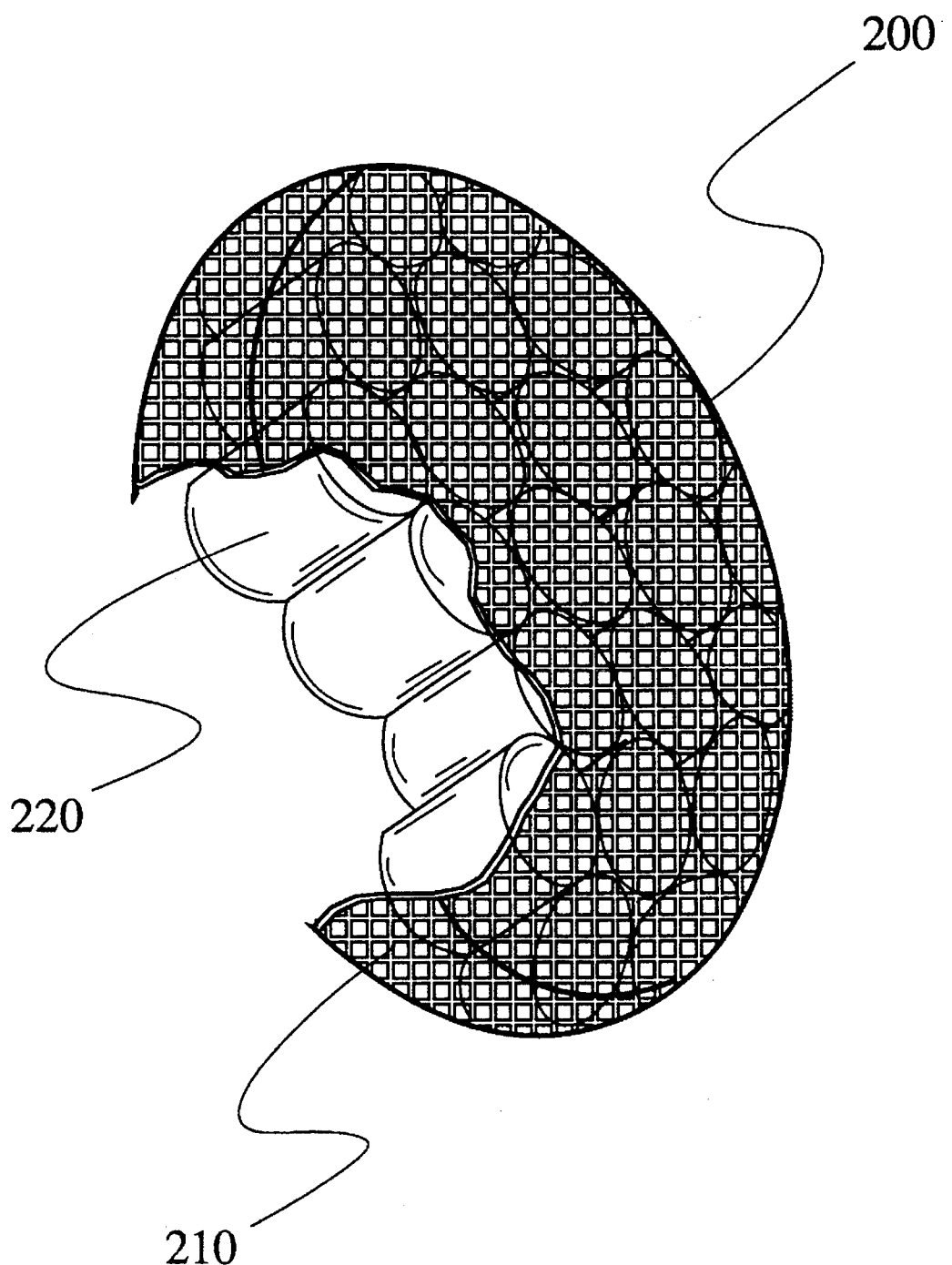
FIG. 2 is a perspective view illustrating the use of multiple film airbags plus a net to form a protection system for a single occupant.

In another particularly useful case, multiple independent airbags are placed within a single net. An example of such an arrangement is illustrated in FIG. 2 which is a perspective view illustrating the use of multiple film airbags plus a net to form a protection system for the vehicle driver.

A net has an advantage over a film in its ability to handle tears. Once a tear begins in a relatively rigid film, the stress concentration at the point where the tear is propagating is very large and approaches infinity for a very rigid film even when the tensile stress in the film as a whole is low. Since the material cannot resist these very large stresses, the tear propagates rapidly and the film fails. An extreme example would be a film made from glass. To the extent that the film will yield and flow plastically there is some resistance to the propagation of the tear but for most plastic films this is quite limited and once a tear begins it rapidly propagates and failure occurs.

In the case of a net, on the other hand, there is no mechanism for a tear to propagate beyond one of the strands. If, for example, a microscopic tear were to appear in one strand that strand might fail. The adjacent strands would experience an increase in tensile force which would rapidly be distributed over many strands if some elastic or plastic deformation of the strands can occur, but a catastrophic failure would in general not occur. Since each strand of the net must fail in tension and, since there is no need for the net to seal the airbag, the strands can be placed at some distance from each other and made quite strong while still using substantially less material than a woven airbag. The woven airbag is in a sense a net with very small openings. As a result it begins to act more like a film than a net with the stress concentration at the tear causing catastrophic failure as each strand of the woven airbag fails.

QUANTITATIVE ANALYSIS

This can be analyzed to give a quantitative understanding of the advantages of a net as follows.

Assume that the net is made up of squares of side m, m much less than bag radius, and that the net material is strong and relatively inextensible, while the film is flexible and relatively extensible. Then the overall shape of the inflated airbag will be defined by the net, and the film will conform to the net.

Film

As an example, assume that the inflated airbag is approximately spherical in shape. Then in the inflated airbag the cords of the net will be approximately, locally at least, circular arcs with a radius of curvature equal to the airbag radius. Consider one of the squares of the net and the film inside that square. Choose a coordinate system in which the corners of the square have zero elevation, and $\xi$ and $\eta$ are the fractional distances from the center to two adjacent edges. Then the following expression for the elevation of any point of the film within the square has the proper symmetry, the proper values on the edges (the circular arcs of the cords), and has a center elevation to be determined:

$$w = \frac{m^2}{4 R_{bag}} \left[ 1 - \frac{\xi^2 + \eta^2}{2} + c(1-\xi^2)(1-\eta^2) \right] \quad (1)$$

where w is the elevation of the film above the plane of the corners, m is the side length of the net square, $R_{bag}$ is the radius of the (spherical) airbag, $\xi$ is the fractional distance from the center of the net square toward one of the sides, $\eta$ is the fractional distance from the center of the net square toward an adjacent side, c is a constant to be determined.

In estimating the damage to the film, it is conservative to assume that the film in a square initially is flat across the corners of the square. If the shear stress and strain in the surface of the film are small, then the tensile stress and strain in any direction will be approximately constant along that direction. The length of a line in the $\xi$ direction from one side of the square to the other is $$\begin{aligned} s_\xi &= \int_{-1}^{1} \sqrt{dw^2 + \left(\frac{m}{2} d\xi\right)^2} \\ &= m \left[ \frac{1}{2} \sqrt{1+\alpha^2} + \frac{1}{2\alpha} \sinh^{-1} \alpha \right] \\ &= m \left[ 1 + \frac{\alpha^2}{6} - \frac{\alpha^4}{40} + \ldots \right], \end{aligned} \quad (2)$$

where $$\alpha = \frac{m}{2R_{bag}} [1 + 2c(1-\eta^2)]. \quad (3)$$

The unstrained length of the same line was m so that the strain in the $\xi$ direction at any point is given by $$\begin{aligned} \epsilon_\xi &= \frac{s_\xi - m}{m} \\ &= \frac{1}{2}\sqrt{1+\alpha^2} + \frac{1}{2\alpha}\sinh^{-1}\alpha - 1 \\ &= \frac{\alpha^2}{6} - \frac{\alpha^4}{40} + \ldots \end{aligned} \quad (4)$$

Along the edge, $\alpha = m/(2R_{bag})$. If m is about 0.25" and $R_{bag}$ is about 10", then the tensile strain along the edge is about $(1/6)(0.25/(2 \times 10))^2 = 2.6 \times 10^{-5}$. Thus when the tensile strain normal to the edge is significant it will be much larger than the strain along the edge, at the edge, and the tensile stress normal to the edge at the edge will be equal to the elastic modulus times the strain normal to the edge, if the strain is elastic. If the strain is plastic, then the tensile stress normal to the edge will be about equal to the yield stress, $\sigma_Y$.

The force on the film, in the direction normal to the plane of the 4 corners, per unit length along the edge will be the tensile stress at the edge in the surface and normal to the edge, times the thickness of the film, times the slope of the film at the edge, or, along the edge $\xi = -1$, $$f = \sigma_\xi h \frac{\frac{2}{m} \frac{\partial w}{\partial \xi}}{\sqrt{1 + \left(\frac{2}{m} \frac{\partial w}{\partial \xi}\right)^2}} = \sigma_\xi h \frac{\alpha}{\sqrt{1 + \alpha^2}} \quad (5)$$

where h is the film thickness and the derivatives are evaluated at the edge. Then the total force, in the direction normal to the plane of the corners, exerted by this side on the film will be $$\int_{-1}^{1} f d\left(\frac{m}{2} \eta\right) = m \int_{0}^{1} f d\eta, \quad (6)$$

and since each of the 4 edges exerts the same force in this direction, and the total force must equal the pressure times the projected area of the square, $$pm^2 = 4m \int_{0}^{1} f d\eta \text{ or } \frac{pm}{4h} = \int_{0}^{1} \sigma_\xi \frac{\alpha d\eta}{\sqrt{1+\alpha^2}}. \quad (7)$$

When the film remains elastic $\alpha$ is small and $$\frac{pm}{4h} = E \int_{0}^{1} \frac{\alpha^3}{6} d\eta = \quad (8)$$
$$\frac{Em^3}{4R_{bag}^3} \left(\frac{1}{12} + \frac{1}{3} c + \frac{8}{15} c^2 + \frac{32}{105} c^3\right).$$

For given pressure, bag size, elastic modulus of film, film thickness and mesh size of net, this may be used to find c. Then the strain distribution in the film and the maximum stress may be found. Alternatively, for given pressure, bag size, film modulus and maximum stress, then for each mesh size the required film thickness may be determined.

For example, consider a 60 liter airbag. If this were spherical then $R_{bag}$ would be 9.56 inches. If the film is unfilled PBT (thermoplastic polyester) then (from Modern Plastics Encyclopedia, mid-October 1992 p.402)

density $\rho$=1.30 to 1.38 gm/cc=0.75 to 0.80 oz/in$^3$, elastic modulus E=280 000 to 435 000 psi, yield stress $\sigma_Y$=8200 to 8700 psi, strain at break $\epsilon_{break}$=50 to 300% (0.5 to 3.0).

A fabric airbag of this size, currently in production, is reported to have a bursting strength of 28 psi gauge, and has a measured weight of 11 ounces.

If the film is to remain elastic, then, using the most conservative combination of properties, the maximum tensile strain must be less than 8200/435 000=0.01885, and $\alpha$ must be less than the square root of 6 times 0.01885, or 0.3363. The maximum $\alpha$ occurs on $\eta$ equal zero, and is $(m/(2R_{bag}))(1+2c)$. If m is 0.25 inches then c must be less than (9.56/0.25)0.3363−0.5=12.36. To achieve this, $$h > \frac{pR_{bag}^3}{Em^2} \frac{1}{\frac{1}{12} + \frac{1}{3} c + \frac{8}{15} c^2 + \frac{32}{105} c^3} = \quad (9)$$

$$\frac{28(9.56)^3/(435000 (0.25)^2)}{\frac{1}{12} + \frac{12.36}{3} + \frac{8}{15} (12.36)^2 + \frac{32}{105} (12.36)^3}$$

or $h > 0.00136" = 1.36$ mils.

Then the weight of the film will be $4\pi R_{bag}^2 h\rho = 4\pi(9.56)^2(0.00136)(0.75 \text{ to } 0.80) = 1.17 \text{ to } 1.24$ ounces. (10)

The following results make use of the full range of material properties with this size airbag and maximum pressure:

for m=0.05", h>0.20 to 0.28 mils and wgt>0.17 to 0.25 oz, m=0.25", h>1.00 to 1.36 mils and wgt>0.86 to 1.24 oz, m=1.00", h>3.82 to 5.08 mils and wgt>3.29 to 4.66 oz. (11)

Maximum pressure: With these values for h the film will not yield at 28 psig. Once yielding begins and the film stretches and bows out it can carry a higher pressure. To estimate the actual burst pressure, assume the minimum unidirectional elongation at break, $\epsilon_{break}$=0.5, and assume that at the center of the square, where the strain in each direction is maximum and the strain is biaxial, that the allowable strain in each direction is 0.5 over the square root of 2, or 0.3536. Since $\alpha$ now is not small, the first result in Eq.(2) is used and the allowable $\alpha_{max}$ is found to be 1.657. This occurs at $\eta$=0, and from the definition of $\alpha$, Eq.(3), together with m=0.25 and $R_{bag}$=9.56, c is found to be 62.864. With E=435 000 and $\sigma Y$=8200 the yield strain is 0.01885, which corresponds to $\alpha$=0.339. Since $\alpha/\alpha_{max}$=1−$\eta^2/(1+1/(2c))$, the portion of the edge between $\eta$=−0.895 and $\eta$=+0.895 is yielding. To be conservative, assume that $\sigma_\xi = \sigma_Y$ in this range and ignore the force from the rest of the edge. Then $$\frac{pm}{4h} = \sigma_Y \int_{0}^{0.895} \frac{\alpha d\eta}{\sqrt{1+\alpha^2}}. \quad (12)$$

With m=0.25, $R_{bag}$=9.56, c=62.864 the integral was evaluated numerically and was found to be 0.661. Then with h=0.00136, the burst pressure is $$P_{burst} = \frac{4(0.00136)8200(0.661)}{0.25} = 118 \text{ psi gauge} \quad (13)$$

Clearly a very substantial factor of safety is available in the film with this geometry. With some experimentation to refine the analysis, the design could, perhaps, be optimized further.

Net

Each square in the net carries a force of p times m$^2$, which is transferred to the sides of the square by the film. The total length of the sides is 4 times m, but each side receives the force from 2 squares, so the normal force per unit length on a side is p times m$^2$ divided by 2 times m, or ½ of p times m. A cord carrying a normal force will have a tension equal to the normal force per unit length times the radius of curvature of the cord, and a stress equal to the tension divided by the cross-section area of the cord. Thus the stress in the cord material will be $$\sigma_{net} = \frac{2pmR_{bag}}{\pi d_{net}^2}, \quad (14)$$

where p is the pressure in the inflated airbag, m is the side length of one square in the net, $R_{bag}$ is the radius of the airbag, $d_{net}$ is the diameter of the net cord.

The number of netting squares needed to cover the airbag is approximately the airbag surface area divided by m$^2$, so the total length of cord needed is 2m times this. Thus the weight of net required is $$\rho_{net}\frac{\pi d_{net}^2}{4}(2m)\frac{4\pi R_{bag}^2}{m^2} = \rho_{net}\frac{1}{4}\left(\frac{2pmR_{bag}}{\sigma_{net}}\right)(2m)\frac{4\pi R_{bag}^2}{m^2} \quad (15)$$

$$= 3\rho_{net}V_{bag}\frac{P}{\sigma_{net}}.$$

where $\rho_{net}$ is the density of the net material,
and the last formula follows from the assumption that the airbag is approximately spherical. This equation shows that for a given net material, airbag geometry and pressure, and stress in the netting, that the required weight of netting does not depend on m, the size of the mesh. This result does not depend on the assumption that the airbag is spherical. The formula shows also that to minimize the weight of the net a strong net material is important. One suitable material would be Kevlar 29 or 49. Yarn, made of this material, is available and has a tensile strength of 420 000 psi and a density of 0.052 pounds per cubic inch (0.83 ounces per cubic inch) (from a DuPont brochure).

If a working stress of 200 000 psi is used for an airbag pressure of 28 psig, a mesh size of 0.25 inches, and an airbag radius of 9.56 inches, then the yarn diameter is $$d_{net} = \sqrt{\frac{2pmR_{bag}}{\pi\sigma_{net}}} = \sqrt{\frac{2(28)0.25(9.56)}{\pi(200000)}} = 0.0146 \text{ in.} = 14.6 \text{ mils} \quad (16)$$

which has a weight of 0.0001389 ounces per inch. The total length of yarn would be $$\frac{8\pi R_{bag}^2}{m} = \frac{8\pi(9.56)^2}{0.25} = 9188 \text{ inches,} \quad (17)$$

with a weight of 9188 times 0.0001389 or 1.28 ounces.

Then the total airbag weight would be 1.28 ounces for the net plus 1.24 ounces for the film, or 2.5 ounces. This is approximately one-quarter the weight of a current (fabric) airbag of the same volume.

For the reasons discussed above it can be seen that a net is a more efficient means for resisting tear propagation than either a woven material or a film. A film, on the other hand, is effective at sealing and retaining the gas in the airbag. A combination of a net and a film thus combines the best properties of both materials. One way to use this combination is to inflate a film airbag inside of a net. If a single film airbag is used and if the film is smaller than the net then a catastrophic failure can still occur. The film airbag should be used to retain and seal the gases and the net to absorb the tensile forces. Therefore, the film airbag should be larger than the net. This requirement can be somewhat relaxed if multiple film airbags are used within a single net. In this case if one of the airbags failed, the others will substantially fill in the void and prevent a catastrophic failure of the entire system. In general, however, it is better not to rely on the film airbags to resist the gross tensile forces caused by an occupant interacting with the airbag but to design the net for that purpose.

FIG. 2, therefore, shows a case where a single net is filled with a plurality of thin film airbags where the airbags are used to seal the gas and the net is used to retain the individual airbags and to supply the main tensile forces to resist the intruding occupant. When a single airbag is deployed into a single net, the system will try to assume an approximately spherical shape. The preferred shape for a driver side airbag, on the other hand, is more like a thick flat disk which requires the use of internal tethers in standard airbags or comparable structure for a single film airbag. This shape can be approximated if multiple film airbags are used to fill the net. The size of each individual airbag determines the composite bag thickness or the extent to which it can project outward toward the driver and the number of such airbags used determines the height and width of the airbag. Naturally the overall size and shape of the net also affects the overall shape of the airbag system. In this manner, any reasonable airbag shape can be approximated without the use of the tethering straps now used with airbags at a substantial cost savings. Alternately, if tethers are still required, they can be placed in the net, between the airbags, if multiple airbags are used.

In FIG. 2 the composite airbag is shown generally at 200 and is comprised of a net 210 and a plurality of film mini-airbags 220. Each of these mini-airbags is attached to a manifold, not shown, which distributes the gas generated by the inflator also not shown. When the sensor and diagnostic system determines that the airbag should be deployed, an electric current is sent to the inflator which thereafter begins generating gas. The gas flows into the manifold and then to the individual film airbags 220 as described in more detail below. Each film airbag 220 inflates and fills the net forming the composite airbag 200 in time to protect the occupant. The net can either be made from a woven material, or it can be molded in which case it can be easily formed to the precise shape desired for a given application.

Multiple airbags reduce the stress in each bag permitting the use of very thin films in some cases less than 0.001 inch. The strands of the net are typically less than 0.02 thick but the net only covers a small portion of the surface of the composite airbag. The result is a composite airbag which when folded and stored, occupies a substantially smaller volume, typically about ¼, than that of conventional airbags of comparable inflated size.

Figure 3:
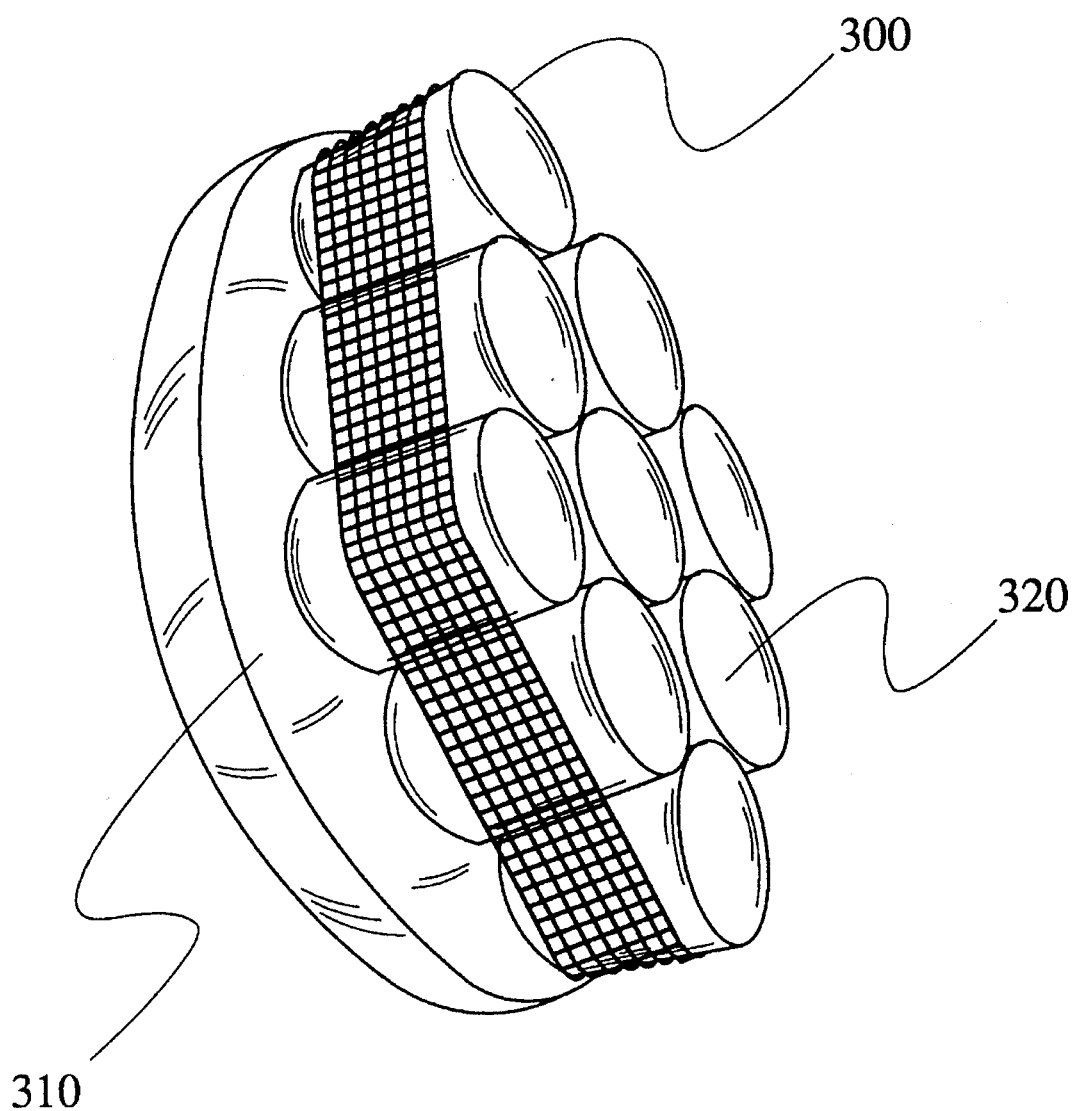
FIG. 3 is a perspective view of a self limiting airbag system composed of a multiplicity of airbags designed to inflate to a designed pressure.

A particularly useful improvement to the system illustrated in FIG. 2 results if the amount of gas used to inflate each of the film airbags is controlled by the pressure within the airbag. If each film airbag is inflated only to the point that the pressure within each airbag reaches a value such as 5 psi, for example, at which time little or no additional gas flows into the airbag, then each airbag will inflate either until it fills completely or until its forward surface interacts with some object such as the occupant. In this manner the deployed shape of the composite airbag is determined by the position and size of the occupant. An example of this self limiting design is illustrated in FIG. 3 which is a perspective view of a self limiting airbag system composed of a multiplicity of airbags designed to inflate to a known pressure. Naturally, if a single large airbag is used, the shape of the airbag will be determined by the shape of the interacting occupant in a similar manner. The difference here is that there is greater flow resistance of the gas going from one airbag to another than from one part of a large airbag to another part. This fact serves to allow the airbag system to better capture the occupant and reduce the chance for him/her to slide off of the airbag system.

In FIG. 3 a driver's side airbag 300 is comprised of a plurality of film airbags 320. During deployment, gas is fed to all of these airbags through a manifold 310, which in this case is in the form of a larger airbag. However, as soon as the pressure in one or more of these airbags reaches some particular level, the flow into the airbag is stopped and the gas continues to flow into the other airbags 320 which still are at low pressure. As soon as all of the airbags reach a limit pressure, the remainder of the gas is shunted into the passenger department through a valve in the manifold 310 as described below.

In FIG. 3, if the driver's side bag is composed of a plurality of mini-airbags, each mini-airbag inflates out to where it impacts the occupant, at which point it stops moving and the pressure builds in the bag cutting off further flow. Since the inertia of the film airbag is very low, the occupant is not injured by this impact. In this design the composite airbag is designed to always interact with the occupant regardless of where he or she is sitting. In this implementation, shown in FIG. 3, the composite airbag is substantially larger than the occupant and therefore wraps around him/her since some of the bags on the peripheral of the composite airbag do not interact with him. This system not only provides a maximum stroke for any particular seating position of the occupant, but also protects him from side motions and somewhat captures him assuring that he will receive the full benefit of the airbag instead of sliding or rolling off it.

The use of multiple airbags and a manifold in addition provides greater control of the manner in which the composite airbag is inflated, and such issues as bag folding become much less important. Through the design of the manifold, as described in more detail below, particular airbags can be inflated preferentially to others permitting parts of the composite airbag to be brought into engagement with the occupant before other parts. In the case of a driver airbag, for example, the center section can be inflated first which will fix the airbag to the occupants chest while the lower part is inflated to provide protection from the lower steering wheel rim. This reduces the chance that the occupant will roll the composite airbag up over the top of the steering wheel compromising the system effectiveness.

In FIGS. 2 and 3, attention was focused on airbags to protect the head and chest of the occupant. Another application for the airbags is for knee protection. An example is shown in FIG. 4 which is a perspective view with certain portions removed of a self-limiting airbag designed to support the knees of an occupant and protect the sleeping child.

Although knee bags have been used in the past, they have been inflated inside of a front passenger airbag and from the same inflator. Today, all knee protection systems rely on non-inflated knee bolsters. However, many people are not receiving proper knee protection from the knee bolsters and the auto companies are concerned with the difficulty in designing effective knee restraints. If the knee bolster is mounted close to the occupant's knees, then customers complain that there is not sufficient leg room. On the other hand, if the knee bolster is too far away, then the occupant can submarine underneath the airbag and be seriously injured, especially if he or she is not wearing a seatbelt. The film and net composite airbag of this invention combined with the improved modular design disclosed in copending patent application—referenced above, results in a low cost system for providing knee protection. Additionally, if the composite airbag is made large enough it can also provide protection for a sleeping child lying on the seat.

Figure 4:
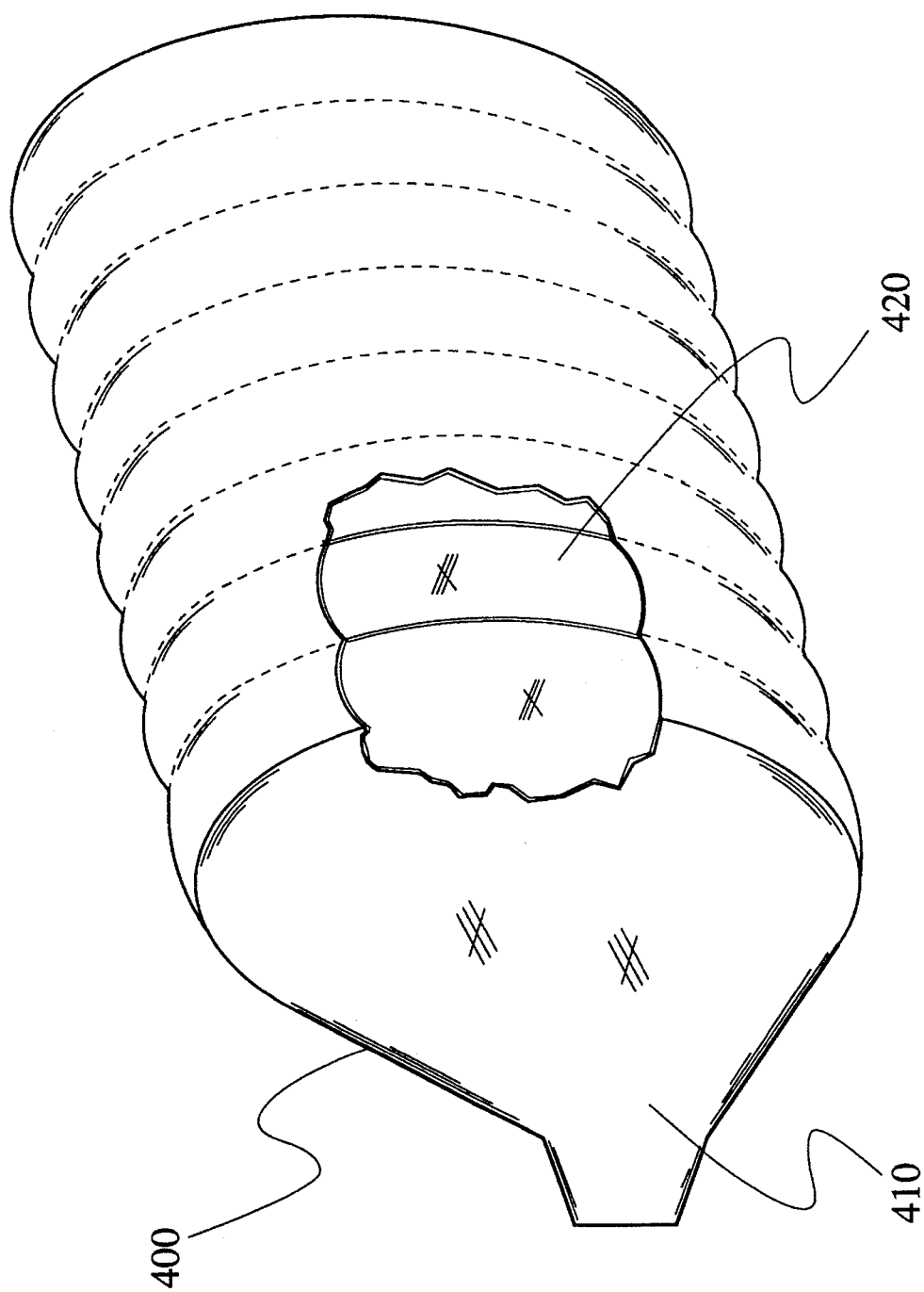
FIG. 4 is a perspective view with certain portions removed of an airbag designed to support the knees of an occupant and protect the sleeping child.

In FIG. 4 a composite knee protection airbag system for the front passenger is shown generally at 400. It includes an outer airbag or net 410, a plurality of film airbags 420, a manifold and an aspirated inflator, not shown. Since each of the airbags 420 acts independently they serve to effectively capture the occupants knee preventing it from moving sideways. Since the airbag fills the entire space between the knee and the instrument panel and since the instrument panel is now located at a substantial distance from the occupants knees, there is substantially more deflection or stroke provided for absorbing the energy of the occupant. Since the deployment of the knee bag is limited only by the interaction with an occupant or some other object, the composite knee airbag will inflate until it fills the void below the upper airbag providing protection to the sleeping child.

Figure 4A:
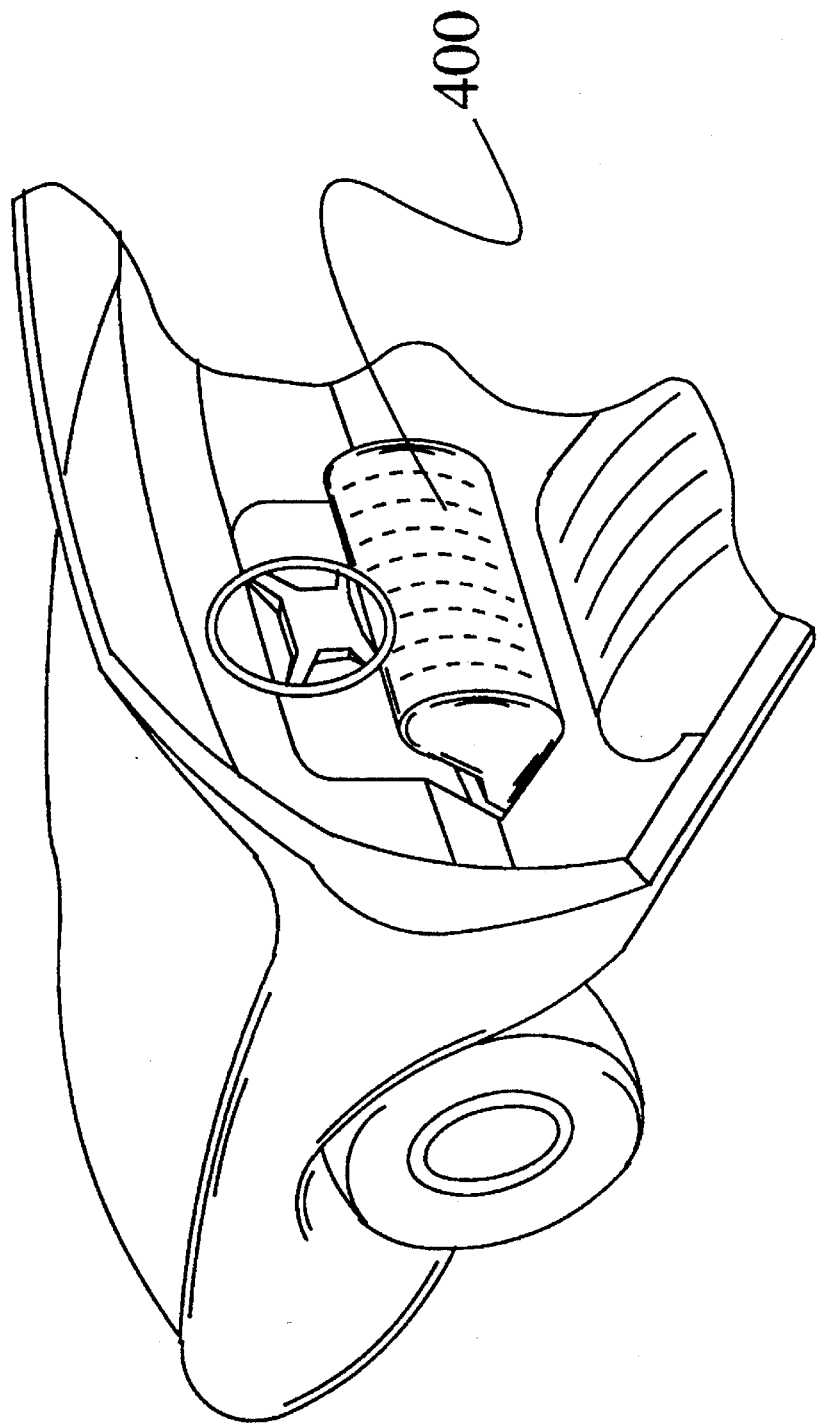
FIG. 4A is a perspective view with portions cut away of a vehicle showing the knee bolster airbag of FIG. 4 in an uninflated condition mounted to provide protection for a driver.

The knee protection airbag of FIG. 4 is shown mounted on a vehicle and inflated in FIG. 4A.

Figure 5:
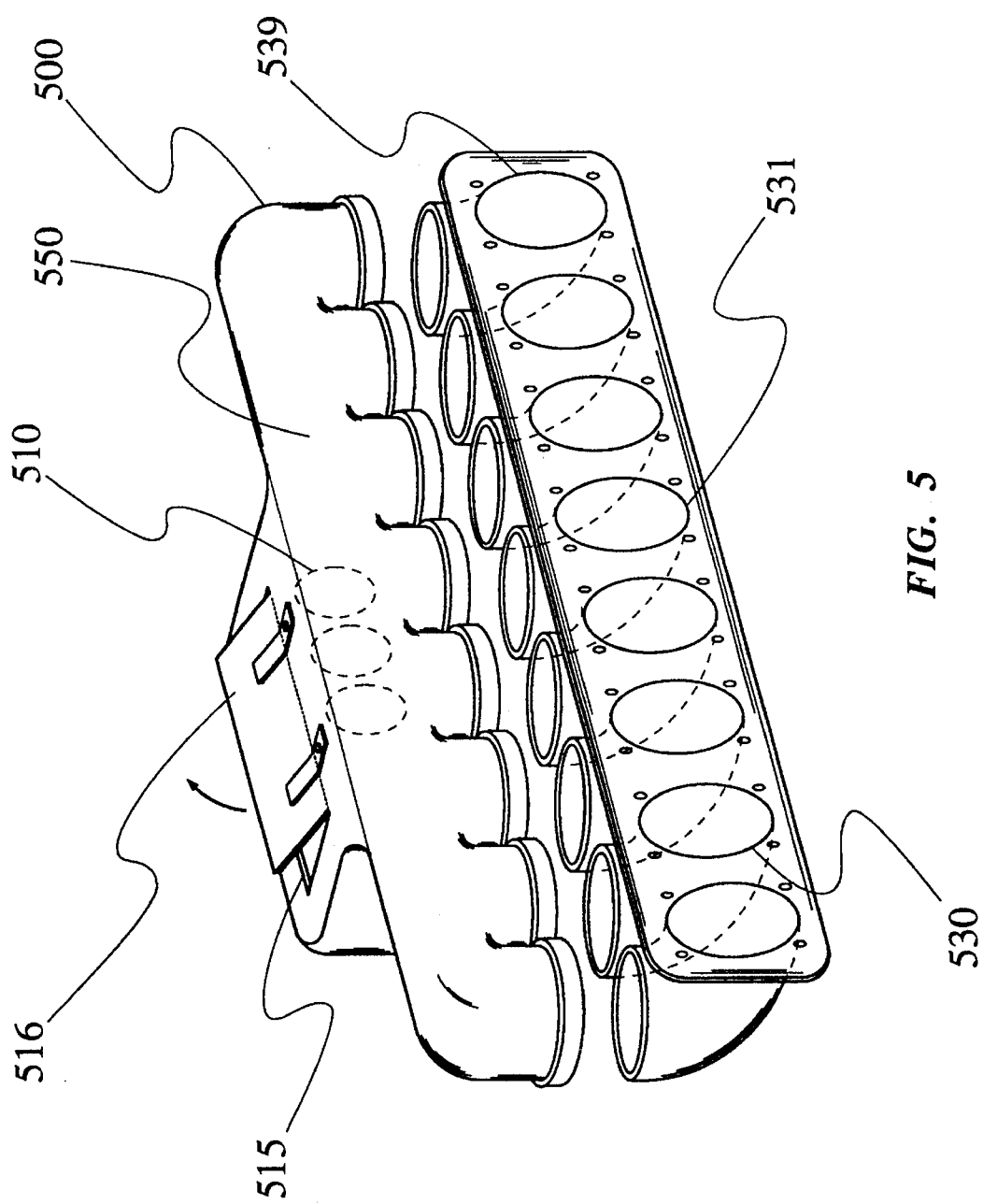
FIG. 5 is a detail of the manifold used to distribute inflator gases to the airbags of FIG. 4 and to provide a variable exit orifice for the gas from the airbags during deflation.

Several of the implementations disclosed above make use of a manifold to distribute the gas from the inflator to the various film airbags. One example of a design of such a manifold is shown in FIG. 5 which is a detail view of the manifold used to distribute inflator gases to the airbags of FIG. 4. In FIG. 5 the manifold is shown generally at 500 and consists of entry ports 510 for receiving gas from the inflator not shown. A plurality of exit ports 530 appear opposite entry ports 510 which lead to the various film airbags. Certain of the exit ports 530 are more nearly in line with the entry ports 510 and therefore receive gas in preference to other of the ports 530. In particular, it is easier for gas to enter port 531 which is directly across from ports 510 than it is for gas to enter port 539 which is substantially displaced from ports 510. As the film airbag attached to port 531 fills, however, the pressure in the airbag increases until additional gas is prevented from entering port 531 and the gas is diverted to the other ports and eventually to port 539. By varying the geometry of the chamber 550 and the diameters of the exit orifices 530, the distribution of the gas from the inflator to the various airbags can be controlled. Eventually, when all of the airbags are filled, the pressure within the chamber 550 increases to where any further gas delivered by the gas generator turns and flows back out through a special port 515 provided in the manifold chamber 550.

One disadvantage of film airbags is that it is more difficult to place exit orifices within the airbag to allow for the discharge of the gas from the airbags during the airbag deflation process. This has been advantageously solved in the example of FIG. 5 through the use of port 515 and spring biased cover 516. When the pressure builds in the manifold chamber 550 either due to the pressure rising in all of the mini-airbags during inflation or due to the loading of the airbag by an occupant during a crash, cover 516 opens and the gas in the manifold exits into the passenger compartment regardless of whether the gas is coming from the inflator or the mini-airbags. A further advantage results in that since the exhaust path is closed until the occupant loads the airbags, the inflator need fill the airbags only once. In current designs, sufficient gas is produced to approximately fill the airbag twice. Finally, if the occupant is pressing against the airbag module cover when the airbag starts to deploy, cover 515 will open and all of the gas will discharge into the passenger compartment preventing serious deployment induced injury to the occupant.

Figure 6:
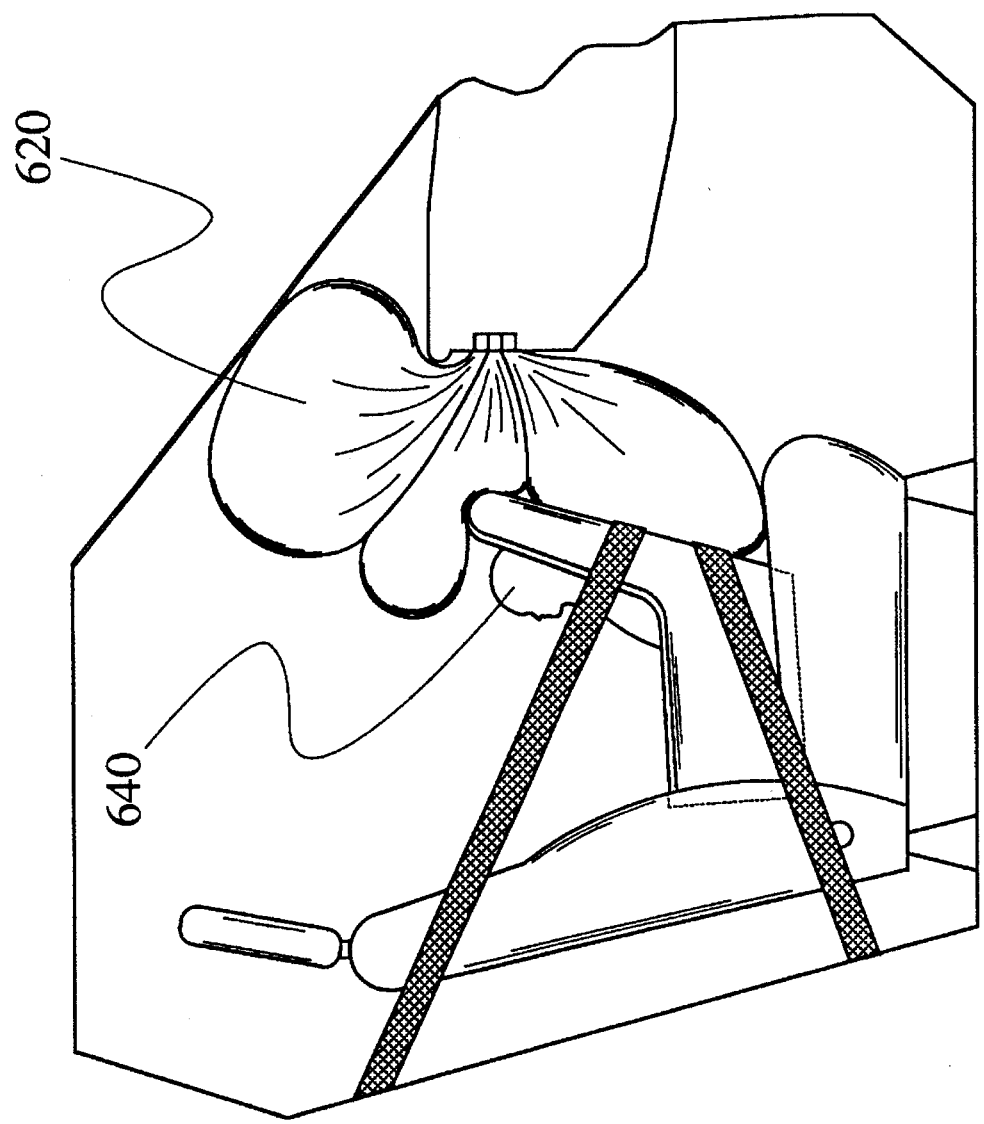
FIG. 6 is a perspective view of a self limiting airbag system composed of a multiplicity of airbags designed to not cause injury to a child in a rear facing child seat.

In FIG. 6 the advantages of the self limiting airbag system disclosed herein, when used with a rear facing child seat, are illustrated. In this case the airbag deploys but the deployment process stops when each of the film airbags interacts with the child seat and the pressure within each bag rises to where the flow is stopped. In this case, the child 640 is surrounded by airbags 620 and further protected from the accident rather than being injured as is the case with current design airbags.

Figure 7:
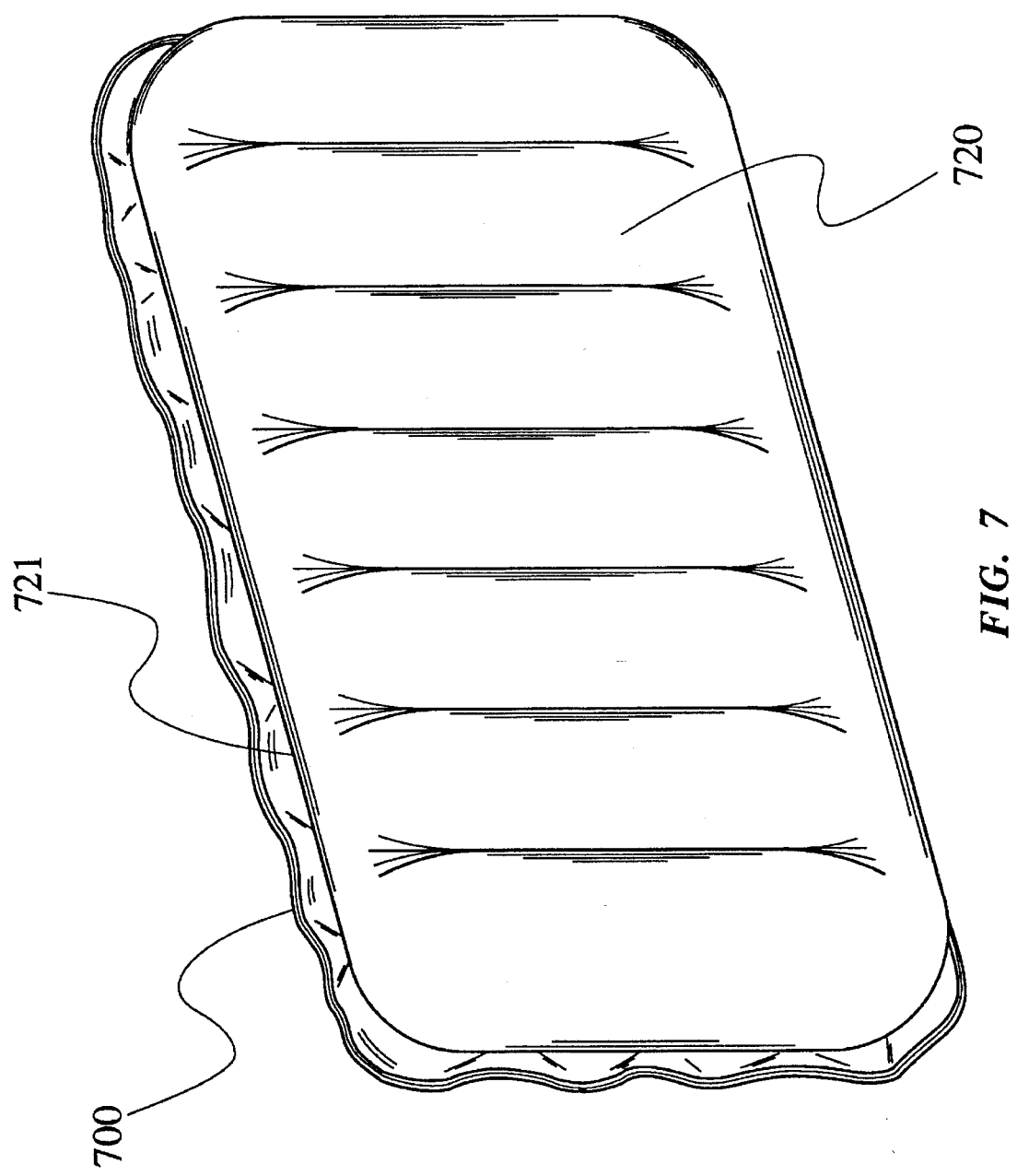
FIG. 7 is a perspective view of an airbag system for rear seat passengers where the airbag is formed from tubes.

One method of forming a film airbag is illustrated generally at 700 in FIG. 7. In this implementation, the airbag is formed from two flat sheets of film material which have been heat or adhesive sealed at joints 721 to form long tubular shaped mini-airbags in much the same way that an air mattress is formed. In FIG. 7, a single layer of mini-airbags 720 is shown. In other implementations, two or more layers would be used. Also, although a tubular pattern has been illustrated, other patterns are also possible such as concentric circles, waffle shaped or one made from rectangles. A modification of the tubular geometry which is suitable for a driver side results when the tubular geometry of FIG. 7 is rolled up with the tube ends pointed at the driver as shown in FIG. 8.

Figure 8:
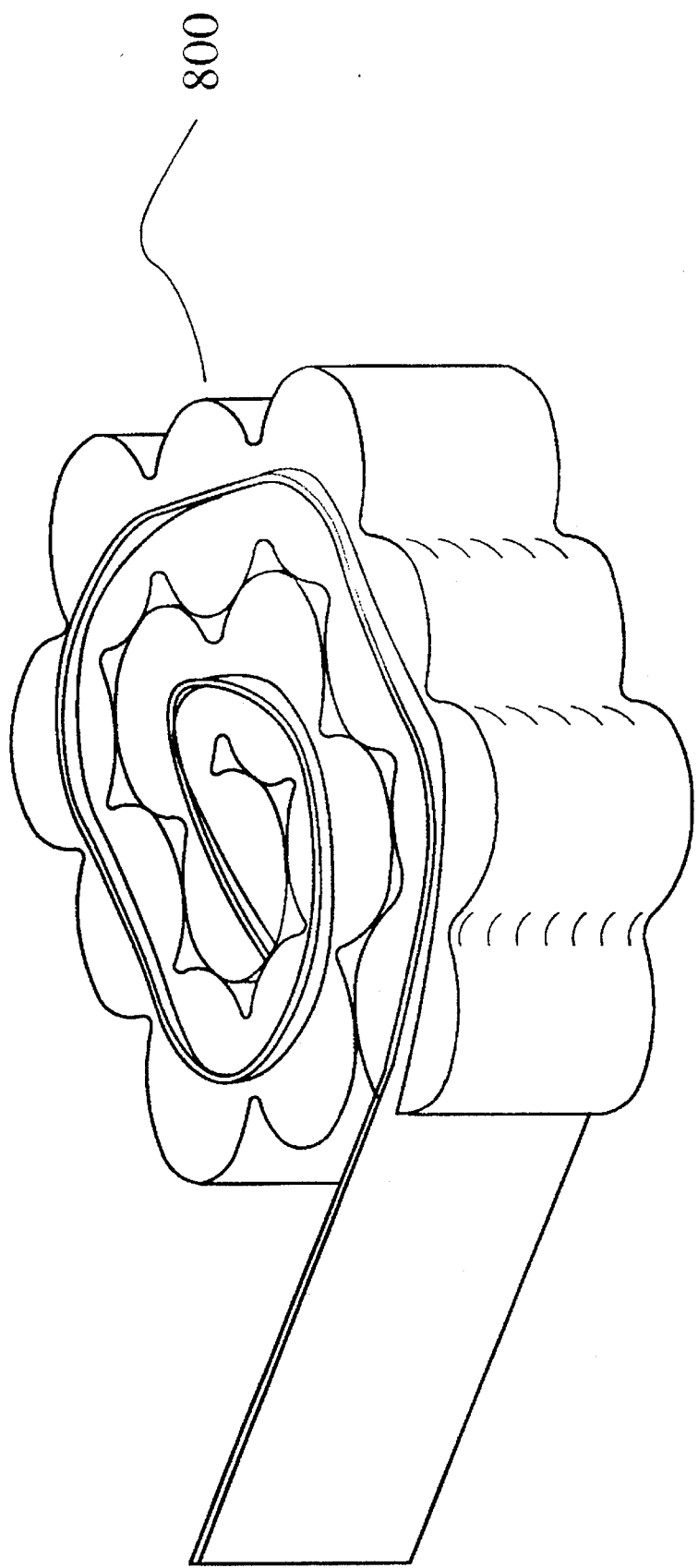
FIG. 8 is a perspective view of a driver airbag made from tubes.
Figure 8A:
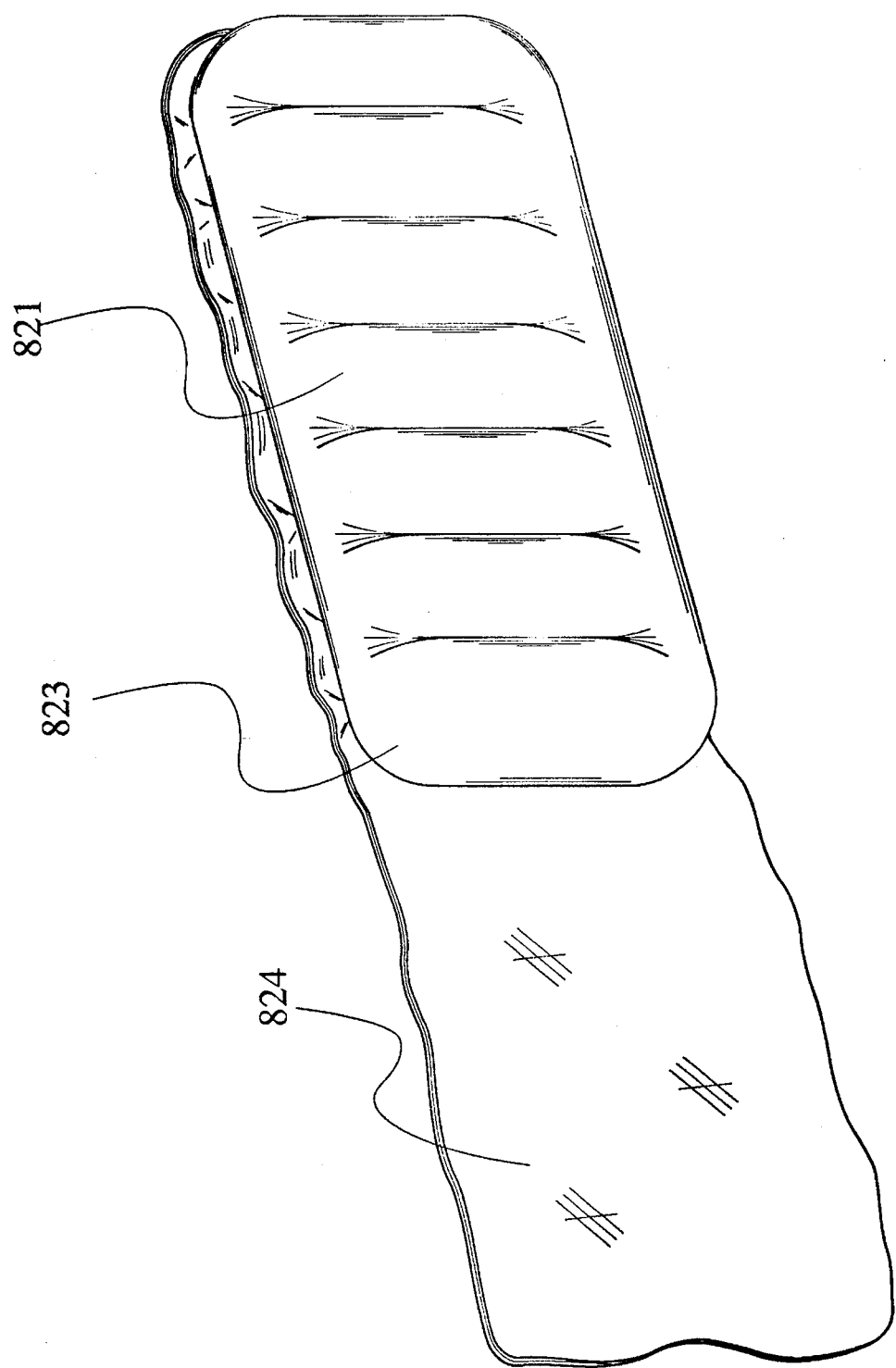
FIG. 8A is a perspective view of a driver airbag of FIG. 8 shown in a condition prior to being rolled.

In FIG. 8 a driver's side airbag is illustrated at 800 which is made in a similar manner as the airbag 700 in FIG. 7. In this case after the flat films are sealed together to form the layer of tubes, the assembly is rolled keeping the tubes parallel, after which the assembly is folded to form the pre-inflated package. When inflated, the tubes extend toward the driver. The airbag is surrounded by several layers of film which holds the tubes in place. A plan view of the tubes before they are rolled is shown in FIG. 8A where the layer 823 is heat sealed with layer 824 to form the tube mini-airbags 821. Excess material from layer 824 is wrapped around the assembly to support and hold the tubes together.

In general, this disclosure has been concerned with plastic film. Naturally other materials including rubber could be used to make films for some airbag applications. Also, the word net as used herein means a material which contains a substantial number of holes and therefore would be porous and not be suitable alone for making an airbag. A net can be made by weaving or knitting threads, string or yarn together or it can be made from plastic by molding. For the purposes herein, a net will include the use of reinforcing fibers distributed within a single film or sandwiched between two or more films. Naturally, a net and a film can be combined together into a single material either by heat sealing, gluing with adhesive, molding or other suitable method. Such a composite structure is included in the terms film and net as used herein.

Although several preferred embodiments are illustrated and described above, there are possible combinations using other geometries, materials and different dimensions for the components that perform the same functions. This invention is not limited to the above embodiments and should be determined by the following claims.

What is claimed is:

1. In a vehicle having an inflatable occupant protection system, an inflatable occupant restraint comprising:

an airbag constructed substantially of nonperforated plastic film means within said nonperforated film to arrest the propagation of a tear;

means to inflate said airbag;

means to attach said airbag to said inflation means;

means to initiate said inflation means in response to a crash of said vehicle; and means to attach said inflation means to said vehicle.

2. The invention in accordance with claim 1 wherein said nonperforated plastic film comprises at least two layers of nonperforated film.

3. The invention in accordance with claim 2 wherein said film layers are attached to each other by an adhesive.

4. The apparatus in accordance with claim 1 wherein said restraint comprises at least two adjacent said airbags.

5. The apparatus in accordance with claim 1 further comprising:

a net substantially surrounding said airbag.

6. In a vehicle having an inflatable occupant protection system, an inflatable occupant restraint comprising:

(a) an airbag comprised substantially of at least one layer of nonperforated plastic film;

(b) means to inflate said airbag;

(c) means to attach said airbag to said inflation means;

(d) means to initiate said inflation means in response to a crash of said vehicle; and (e) means to attach said inflation means to said vehicle;

wherein means are provided within said nonperforated film to arrest the propagation of a tear.

7. The invention in accordance with claim 6 further comprising vent means mounted within said inflation means for deflating said airbag.

8. The invention in accordance with claim 6 wherein said airbag is a composite airbag.

9. The invention in accordance with claim 6 further comprising reusable vent means mounted within said inflation means for deflating said airbag.

10. The apparatus in accordance with claim 6 wherein said restraint comprises at least two adjacent said airbags.

11. The apparatus in accordance with claim 6 further comprising:

a net substantially surrounding said airbag.

12. In a vehicle having an inflatable occupant protection system, an inflatable occupant restraint comprising:

an outer airbag comprising at least one nonperforated layer of plastic film;

at least one inner airbag, each said inner airbag comprising at least one nonperforated layer of plastic film, said at least one inner airbag when inflated substantially filling said outer airbag;

said at least one inner airbag comprised of a material having substantially anisotropic tear properties;

means to join said at least one inner airbag to said outer airbag;

means to inflate said at least one inner airbag;

means to attach said at least one inner airbag to said inflation means;

means to initiate said inflation means in response to a crash of said vehicle; and means to attach said inflatable occupant restraint to said vehicle; and wherein said outer airbag is comprised of a material having substantially anisotropic tear properties and the direction of least tear resistance for said outer airbag is substantially different from the direction of least tear resistance of said at least one inner airbag.

13. The invention in accordance with claim 12 wherein said inner and outer airbags are joined together with adhesive.

14. The invention in accordance with claim 13 wherein said adhesive is applied in a pattern.

15. The invention is accordance with claim 12 wherein said inner and outer airbags are heat sealed together.

16. The invention in accordance with claim 12 wherein said inner and outer airbags are comprised of different materials.

17. In a vehicle having an inflatable occupant knee protection system and at least one seat, an inflatable occupant restraint comprising:

at least one knee restraint airbag comprising nonperforated plastic film;

means within said nonperforated plastic film to arrest the propagation of a tear;

inflation means for providing gas to said at least one knee restraint film airbag;

means to attach said at least one airbag to and in fluid communication with said inflation means;

means to initiate said inflation means in response to a crash of said vehicle; and means to attach said inflation means to said vehicle.

* * * * *